H. M. SCHEIBE.
SYSTEM OF MULTICURRENT DISTRIBUTION.
APPLICATION FILED MAY 27, 1912.
1,112,482.
Patented Oct. 6, 1914.
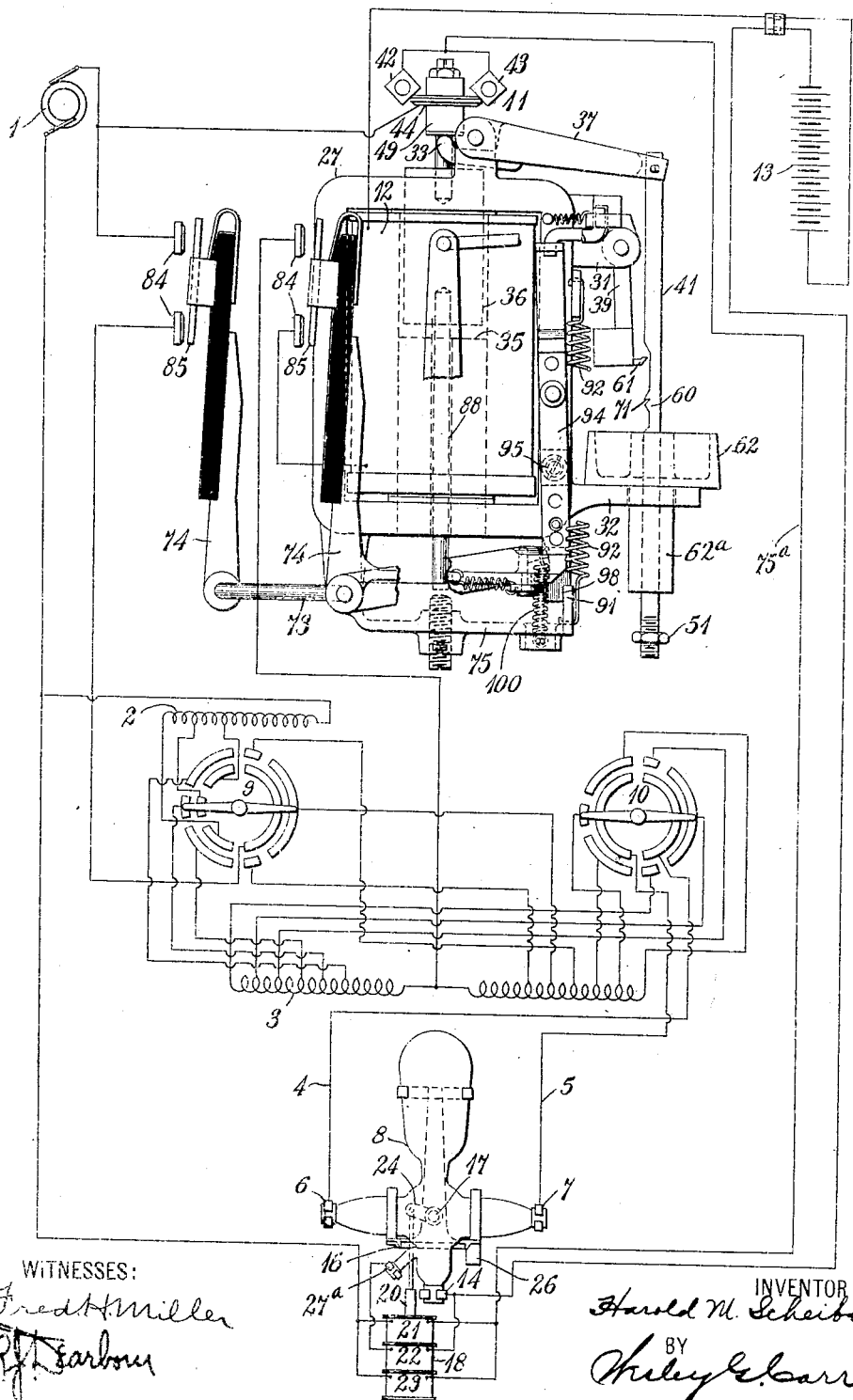

UNITED STATES PATENT OFFICE.

HAROLD M. SCHEIBE, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF MULTICURRENT DISTRIBUTION.

1,112,482. Specification of Letters Patent. Patented Oct. 6, 1914.

Original application filed October 8, 1910, Serial No. 586,079. Divided and this application filed May 27, 1912. Serial No. 700,003.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Systems of Multicurrent Distribution, of which the following is a specification.

My invention relates to systems of electric current regulation and distribution and it has special reference to such systems as embody an alternating current source of energy, secondary electric batteries or accumulators and an interposed vapor rectifier.

The object of my invention is to provide a system of the class above indicated that shall be particularly reliable in operation and adapted for general use where a skilled attendant is not available.

In my co-pending application, Serial No. 586,079, filed October 8, 1910, of which this application is a division, and which has matured into Patent No. 1,036,914, issued Aug. 27, 1912, I have shown and described a system of electric current regulation and distribution of the above-named character and have laid claim to an automatic governor for controlling the starting and stopping of a vapor rectifier and for automatically interrupting both the alternating and direct current circuits of the system under predetermined abnormal conditions. I am now claiming the system of regulation and distribution as a whole.

The single figure of the accompanying drawings is a diagrammatic view of a battery-charging system embodying my invention.

Referring to the drawing, alternating current energy may be supplied from any suitable source, such as generator 1, through a reactance member 2, an auto-transformer 3 and circuit conductors 4 and 5, to the terminals 6 and 7 of the vapor rectifier 8. Regulating dials 9 and 10 are adapted to so vary the circuit connections of the auto-transformer 3 as to adjust the alternating current voltage impressed upon the rectifier. A relay switch 11 is introduced into a circuit conductor 75$^a$ which supplies energy for tilting the rectifier bulb, and its coil 12 is connected in series with the direct current circuit of the rectifier, which may include a storage battery 13 or some other suitable load. One terminal of the load is connected to the middle point of the auto-transformer 3 and the other is connected to the direct current terminal 14 of the rectifier bulb.

The rectifier comprises a substantially cruciform bulb, a supporting frame 16 therefor, which is pivotally mounted on a shaft 17, and a starting or tilting magnet 18 having a movable core member 20 and magnet coils 21, 22 and 23. The frame 16 is provided with a crank projection 24 which is connected to the movable core member 20, the arrangement of parts being such that, when the coils 21 and 23 are energized, the rectifier will be so tilted, in opposition to a weight 26, that the mercury within the rectifier bulb will form a circuit connection between the direct current terminal 14 of the rectifier and a starting terminal 27$^a$, in a well known manner.

The relay switch 11 comprises a substantially rectangular frame 27, a bracket 32 on one side of the coil 12, stationary and movable core members 35 and 36, a lever 37 which is pivotally connected to the frame 27, a latch arm 39 pivotally suspended from a lug 31, a weight-bearing rod 41 pivotally suspended from the outer end of the lever 37, stationary contact terminals 42 and 43 and a movable contact member 44 that is operatively connected to the core member 36. The inner end of the lever 37 has a projection 33 which is adapted to engage the under side of an enlargement 49 on a rod which constitutes the means of connection between the movable core member and the contact member 44. The weight of the rod 41 normally tends to move the contact member 44 into engagement with the stationary contact terminals 42 and 43. The rod 41 is provided with a notched projection 60 which is engaged, under predetermined conditions, by a finger 61 at the lower end of the arm 39. A floating weight 62 is loosely mounted on the rod 41 above the bracket 32, upon which it rests, except when the magnet winding 12 is energized to a predetermined degree. The weight 62 is provided with a sleeve portion 62$^a$ which surrounds the rod 41 and is adapted to pass through an opening in the bracket 32. The arm 39 is normally free to resume the position that is determined by its center of gravity and is so formed that the finger 61 tends to engage a notch 71 in the projection 60 of the rod 41, but the contour of the projection is such that the finger will pass over the notch if the rod 41 is actuated to pass very rapidly in either direction. A nut 51 on rod 41 is adapted to engage the lower end of the floating weight 62 and to lift this weight from the bracket 32 after the movable core member of the electromagnet has moved through a portion of its path of travel, and the arrangement of parts is such that the finger 61 comes into engagement with the notch 71 at this point. By this means, the weight rod 41 is latched, when the electro-magnet is energized by a current which is slightly less than the approximate predetermined value, so that the contact member 44 is held positively from engaging the stationary terminals 42 and 43.

Bell crank levers 74 and an arm or lever 75 are pivotally supported by the frame 27 on a pin 73 and the levers 74 carry movable contact members 85, which coöperate with pairs of stationary contact members 84. The arrangement of the parts is such that upward movements of the arm 75 are transmitted directly to the bell crank levers, while a downward movement of the arm tends to separate it from the levers. A spring 100, however, constrains the levers 74 to follow the arm 75 and thus tend to separate the contact members. Such downward movements of the core member 36 as accompany the normal operation of the relay switch, do not affect the arm 75, but, if the coil 12 is traversed by abnormally large currents, the core member 36 will be forced downwardly to such an extent that the lower end of a rod 88, which is secured to the core member 36, extends downwardly through a hole in the stationary core member 35 and engages the arm 75. When a projection 91 of the lever 75 engages a notch 98 of a lever 94, which is pivoted at 95 on the frame 27, springs 92 are under tension and the circuit breaker may occupy its open circuit position. If the arm 75 is released from the notch 98, the springs 92 will lift the arm 75 and produce such rotative movement of the bell crank levers 74 as to close the circuit breaker.

The operation of the system is as follows: Assuming that the relay switch is open, the circuit interrupter closed and the rectifying process in operation, the relay coil 12 being energized sufficiently to separate the contact member 44 from the terminals 42 and 43, the arm 41 and the weight 62 being raised so that the notch 71 is somewhat above the finger 61, and the storage battery only partially charged, if the rectifying process is interrupted, for any reason, such as the interruption of the alternating current supply circuit, the relay switch will, of course, be closed, since the coil 12 will be deënergized by reason of the failure of the current traversing the direct current circuit of the rectifier and the weight 62 will pull the rod downward with such force that the notch 71 will pass by the finger 61 without engaging it. An alternating current circuit is therefore completed through the relay switch to the magnet coils 21 and 23 of the magnet 18, the energizing of which will be followed by a tilting of the rectifier bulb. The mercury contained in the bulb will then form a circuit connection between the terminals 14 and 27ª of the rectifier and, by this means, the coil 22 will be short circuited, thereby neutralizing the pulling force exerted by the coils 21 and 23 on the core member 20 and permitting the counterweight 26 to return the rectifier to its normal operating position. The short circuit, referred to above, will thus be interrupted and an electric arc produced, so that the alternating current voltage applied to the rectifier terminals may start the rectifying process, in a well known manner. The action of the starting magnet will obviously be repeated if the rectifier fails to start. The voltage applied to the rectifier bulb is so proportioned that, when the battery is fully charged, its counter-electromotive force will sufficiently oppose the direct current voltage of the rectifier to interrupt the rectifying process and deënergize the relay switch. This occurs after the current has fallen below a predetermined limit which is not sufficient to keep the relay switch open, in opposition to both the weights of the rod 41 and the weight 62 and, consequently, the switch has moved slowly toward its closed position until the weight 62 comes into engagement with the bracket 32, the parts having thus been brought to rest long enough for the projection 61 of the arm 39 to come into engagement with the notch 71. When the rectifier ceases to operate, and the relay coil is thereby completely deënergized, the relay is latched, so that the circuit of the starting device is held open. In order to start the rectifier, it is necessary to release the weight rod 41, which may be accomplished by rotating the latch 39. Thus, it is apparent that the rectifying process may be automatically stopped and prevented from attempting to restart when the current traversing the direct current circuit falls gradually below a predetermined amount, although it will be automatically restarted in the manner previously described if the rectifying process is suddenly interrupted under other conditions.

The two poles of the circuit interrupter are respectively connected in the alternating current supply circuit and in the direct current circuit of the rectifier. The circuit interrupter will, of course, remain closed under normal conditions, but it is possible that, if the rectifier is used for battery-charging purposes, the charging plug may be short-circuited, or some other accident may cause a very large current to be drawn from the direct current circuit of the system, in which case, it is desirable to automatically interrupt both the alternating and direct current circuits. The structure of the relay switch is such, as already described, that, under overload conditions, the movable core member 36 is forced downwardly with sufficient force to move the arm 75 downwardly in opposition to the action of the springs 92. If this movement is continued, the circuit breaker will be opened and will be prevented from closing by the engagement of the projection 91 with the notch 98.

In order to restart the rectifier, it is only necessary to disengage the projection 91 from the notch 98 and to so release the circuit interrupter as to permit it to close. The details of this mechanism are shown in Patent No. 1,036,914 previously referred to and need not be further described herein.

I claim as my invention:

1. The combination with an alternating current supply circuit, a vapor rectifier, a direct current receiving circuit, starting means for the rectifier, automatic re-starting means for the rectifier, and means dependent upon an abnormal current in the direct current receiving circuit for interrupting both the alternating current supply circuit and the direct current receiving circuit.

2. In a battery-charging system, the combination with an alternating current supply circuit, a vapor rectifier, a storage battery, starting means for the rectifier, and means dependent upon an interruption of the charging current for re-starting the rectifying process, of a circuit interrupter, and means dependent upon an abnormal current in the battery circuit for actuating the interrupter to open the alternating current supply circuit and the storage battery circuit.

3. In a battery-charging system, the combination with an alternating current supply circuit, a vapor rectifier, a storage battery, starting means for the rectifier, means dependent upon an interruption of the charging current for re-starting the rectifying process and means dependent upon the weakening of the charging current for preventing the restarting of the rectifying process, of a circuit interrupter, and means dependent upon an abnormal current in the battery circuit for actuating the interrupter to open the alternating current supply circuit and the storage battery circuit.

In testimony whereof, I have hereunto subscribed my name this 11th day of May, 1912.

HAROLD M. SCHEIBE.

Witnesses:
 OLIVER S. JENNINGS,
 B. B. HINES.